United States Patent [19]

Postner

[11] 4,430,352
[45] Feb. 7, 1984

[54] PREPARATION OF FRESH CHOPPED ONIONS WHICH MAY BE DISPENSED FROM TUBES

[75] Inventor: Hermann Postner, Ludwigsburg, Fed. Rep. of Germany

[73] Assignee: Societe d'Assistance Technique pour Produits Nestle S.A., Lausanne, Switzerland

[21] Appl. No.: 377,433

[22] Filed: May 12, 1982

[30] Foreign Application Priority Data

May 12, 1981 [DE] Fed. Rep. of Germany ....... 3118810

[51] Int. Cl.$^3$ .......................... A23L 1/212; B65B 55/04
[52] U.S. Cl. .................................... 426/115; 426/639; 426/394; 426/407
[58] Field of Search .................... 426/615, 115, 96, 99, 426/102, 103, 291, 325, 638, 639, 394, 412, 321

[56] References Cited

U.S. PATENT DOCUMENTS 3,098,750 7/1963 Prater et al. .......................... 426/639
3,138,464 6/1964 Kruse .................................. 426/615

FOREIGN PATENT DOCUMENTS 2185359 2/1974 France ................................. 426/615

Primary Examiner—Raymond N. Jones
Assistant Examiner—Elizabeth J. Curtin
Attorney, Agent, or Firm—Vogt & O'Donnell

[57] ABSTRACT

Fresh, chopped onions may be packed as preparations in tubes and may be dispensed therefrom without disturbing the consistency when the preparation contains from 88 to 92% of raw onion cubes having an edge length of from 3 to 6 mm, from 0.05 to 0.1% of sodium metabisulphite, from 0.1 to 0.5% of tartaric acid and/or citric acid, from 0.05 to 0.20% of ascorbic acid, from 0.05 to 0.2% of swelling agent, about 1% of common salt, from 3 to 5% of sugar or a sugar alcohol, from 3 to 5% of vegetable oil and from 0.05 to 0.15% of emulsifying agent. After being filled into tubes, this preparation is heated for a short time to from 70° to 80° C. The onion particles retain their consistency over a comparatively long period of time and may be used in the same way as freshly cut onions.

5 Claims, No Drawings

PREPARATION OF FRESH CHOPPED ONIONS WHICH MAY BE DISPENSED FROM TUBES

As is known, pasty substances, mixtures and preparations may be simply and easily filled into tubular packs, stored therein and then squeezed out from these containers for use in the required quantity. Thus, it is conventional to always sell toothpaste in tubes which are made of aluminium or plastics. Ointments and adhesives are likewise presented to the consumer in tubes. Considerable advantages are also provided in daily use for food preparations which are in paste form, such as mayonnaise, mustard, mixtures of seasonings or tomato purée when they are presented to the consumer in tubes, because the contents of the tube may be added to the dish in an exactly metered quantity, after which the container may be tightly re-sealed, so that these foodstuffs are reliably protected against the entry of air and from going bad.

Packaging in a tube, which allows the contents of the tube to be simply metered out when they are dispensed would also be very advantageous for other foodstuffs or food additives which are not in the form of a paste. However, attempts to achieve this have hitherto been unsuccessful, precisely because the substances are not in the form of a paste. Thus, for example, onions are a frequently used seasoning in the kitchen and are already presented to the consumer in a wide variety of preserved forms, which can be directly added to a dish. Raw onion juice concentrates are known (German Auslegeschrift No. 1,792,366), as are fried onion-flavoured preparations, in which the juice is heated with edible oil to from 100° to 150° C. (German Auslegeschrift No. 1,239,925), and raw onions which have optionally been heated for a short time and are pickled in vinegar or brine (British Pat. No. 1,274,385) are also known. Furthermore, a form of cut, fried onions which have good keeping qualities is known, see German Auslegeschrift Nos. 1,219,782 and 1,241,246. Keeping qualities may also be achieved by drying chopped onions. However, the taste of the onions is changed considerably by all of these measures, so that these types of preservation have disadvantages for products as sensitive as onions.

Chopping fresh onions is an unpleasant task, because the volatile aromatic components of raw onions irritate the mucous membranes of the eyes. Thus, attempts have been made for a long time to bring finely chopped onions into a preserved form. Particular difficulties have arisen during such attempts, because enzymes which are peculiar to the cells of raw onions are released by the cutting action and during storage lead to a decomposition reaction of the tissue and the aromatic components. The vegetable onion tissue is also very watery, so that the small pieces of onion which have been cut tend to release water contained in the cells, as a result of which the firm onion structure collapses.

The production of an instant preserve of fresh onions is already known from German Auslegeschrift No. 1,178,685. For this preserve, the freshly peeled onions are cut into pieces with a side length of from 1 to 10 mm, whereupon the chopped onion mass is pickled in order to deactivate the enzymes which may cause the decomposition reaction during storage. This pickling operation is carried out by adding to the onion mass a considerable quantity of from 6 to 12% common salt, a thickening agent, such as pectin, and ascorbic acid and citric acid. A flavone derivative, for example vegetable yellow may optionally also be added. This mixture is supposed to show adequate stability as a preserve, i.e., packed in cans. However, only a restricted use of this product is possible due to the salt content used for pickling.

An object of the present invention is to provide a new preparation of fresh onions in chopped cube form which is stable when packed in tubes, without the taste of the raw onions being changed, and which may be dispensed from the tubes without the onion cubes which issue therefrom losing their loose particulate shape. This object is achieved according to the present invention in that raw onions are chopped into the required cube shape, prefeably into cubes having dimensions of about $6 \times 6 \times 3$ mm, after which dry sodium metabisulphite, ascorbic acid and sugar or sorbitol and a small quantity of a material which is capable of swelling in the presence of water are added to the cube mass with careful mixing which does not destroy the structure of the onion. The following quantities are generally used, based on the final mixture: from 88 to 92% of onions, from 0.05 to 0.1% of sodium metabisulphite, from 0.05 to 0.2% of ascorbic acid, from 0.1 to 0.5% of tartaric acid and/or citric acid, from 0.05 to 0.20% of swelling agent, such as galactomannan or xanthan, in powdered form, and from 3 to 5% of sugar or a sugar alcohol, for example sorbitol, and about 1% of NaCl to improve the taste. The pH is reduced to below 4.0 by these additives. From 3% to 5% of fat mixture of vegetable oil, such as soya oil, and from 0.05 to 0.15% of emulsifying agent, such as is conventional for mayonnaise preparations are then added. This mixture may optionally also contain emulsified therein a small amount of onion extract to balance the flavour of the fresh onions which is present and which varies in intensity depending on origin and type. The fresh onion preparation thus obtained is then filled into medium-size 200 to 300 cm$^3$ tubes, and is then heated for a short time to from 70° to 80° C. and pasteurized. The product will keep without discolouring and without changing in taste for a comparatively long time, i.e., for more than six months. The cubes maintain their shape when squeezed out of the tube and they look like freshly cut onions.

The tubes used for packing should have an outlet opening with a diameter of from about 1 to 1.5 cm, which approximately corresponds to from two to three times the edge length of the cut onion cubes.

The fresh onion cube preparation according to the present invention may be used in exactly the same manner as freshly cut or chopped onions, for example, for the preparation of steak tartar, in salads and sauces etc. Thus, the present invention solves a long-existing problem in a surprisingly simple and reliable manner. The consumer no longer has the unpleasant task of cutting raw onions, which is associated with irritation of the lachrymal gland. He has a product which cannot be distinguished from directly produced, finely cut raw onions, because only a relatively small quantity of the fat mixture to be used according to the present invention is present, although it still exerts the required preserving and form-stabilizing effect on the cube particles. It was also unforeseeable that the pasteurization of the onion preparation which is required for preservation does not change the preparation to such an extent that the pressure used to squeeze the cubes out of the tube does not result in a loss of their loose form. Onion water, which the short heat treatment can cause to separate in some cases, is bound by the combination of the additives, so that a liquid phase does not form. In contrast to the known onion preparations, preservation is not achieved by a relatively high salt concentration which has a pickling effect or by larger quantities of acid, but stability against enzymatic and microbial decomposition and against loss of consistency and flavour is achieved by the functional combination of mild pasteurization and by only a slight fall in the pH caused by relatively small quantities of specific organic acids, together with the oil which is also only present in a small quantity.

EXAMPLE

Whole, peeled onions which had been stored at from 0° to 5° C. are cut into cubes having dimensions of 6×6×3 cm in a cutting machine like Holac Type VA 120 of E. Holz Maschinenbau of Heidenhaim, or made by August Herbort GmbH in Braunschweig or in a so-called Urschel-Dicer Model SL-A of Urschel Laboratories Inc. of Valparaiso, Ind., U.S.A. A dry pre-mix of 80 g of sodium metabisulphite, 270 g of tartaric acid, 150 g of citric acid, 100 g of a finely powdered mixture of galactomannan and xanthan (1:1), 1,000 g of common salt and 3,800 g of sugar is then added to 90 kg of these cut onions in a batch mixer, mixed for 3 minutes and then combined with a fat mixture consisting of 4,400 g of vegetable oil (soya bean oil), 100 g of commercial monoglyceride and 100 g of onion extract which had been intensively emulsified in a stirrer. The maximum mixing time should be from 3 to 5 minutes to prevent damage to the texture.

250 cm$^3$ portions of the mixture thus obtained are filled into aluminium tubes having a diameter of 40 mm, the rear end of the tube is sealed in conventional manner, and the mixture in the tubes is pasteurized in an autoclave under water or steam at 80° C. The tubes are recooled after pasteurization.

The onion cubes come out loosely from the tube and look fresh as raw onion cubes. The tube being reclosed, the content is stable, even during a long storage. There is in particular no water separation nor change in colour.

I claim:
1. A preparation of fresh, chopped onions which may be dispensed from tubes, containing
    (a) from 88 to 92% of raw onion cubes having an edge length from 3 to 6 mm,
    (b) from 0.05 to 0.1% of sodium metabisulphite,
    (c) from 0.1 to 0.5% of tartaric acid and/or citric acid,
    (d) from 0.05 to 0.2% ascorbic acid,
    (e) from 0.05 to 0.2% of swelling agent,
    (f) about 1% of common salt
    (g) from 3 to 5% of sugar or a sugar alcohol,
    (h) from 3 to 5% of vegetable oil and
    (i) from 0.05 to 0.15% of emulsifying agent.
2. An onion preparation according to claim 1, which also contains a small quantity of onion extract to balance the flavour.
3. A reclosable tube containing the preparation of claim 1.
4. A process for the production of an onion preparation according to claim 1, which comprises adding a dry pre-mix of the quantities defined in claim 1 of sodium metabisulphite, tartaric acid and/or citric acid, ascorbic acid, swelling agent, common salt and sugar or a sugar alcohol to said chopped raw onion cubes, mixing the admixture under conditions which do not destroy the structure of the onion cubes, admixing an already prepared mixture which contains vegetable oil and emulsifying agent, filling the mass under pasteurizing conditions into reclosable tubes and sealing said tubes, and pasteurizing the contents by heating the tubes for a short time at a temperature from 70° to 80° C.
5. The process of claim 4, wherein the said prepared mixture additionally contains onion extract.

* * * * *